No. 862,859. PATENTED AUG. 6, 1907.
H. E. WARREN & I. B. DODGE.
RELIEF VALVE.
APPLICATION FILED JUNE 29, 1905.
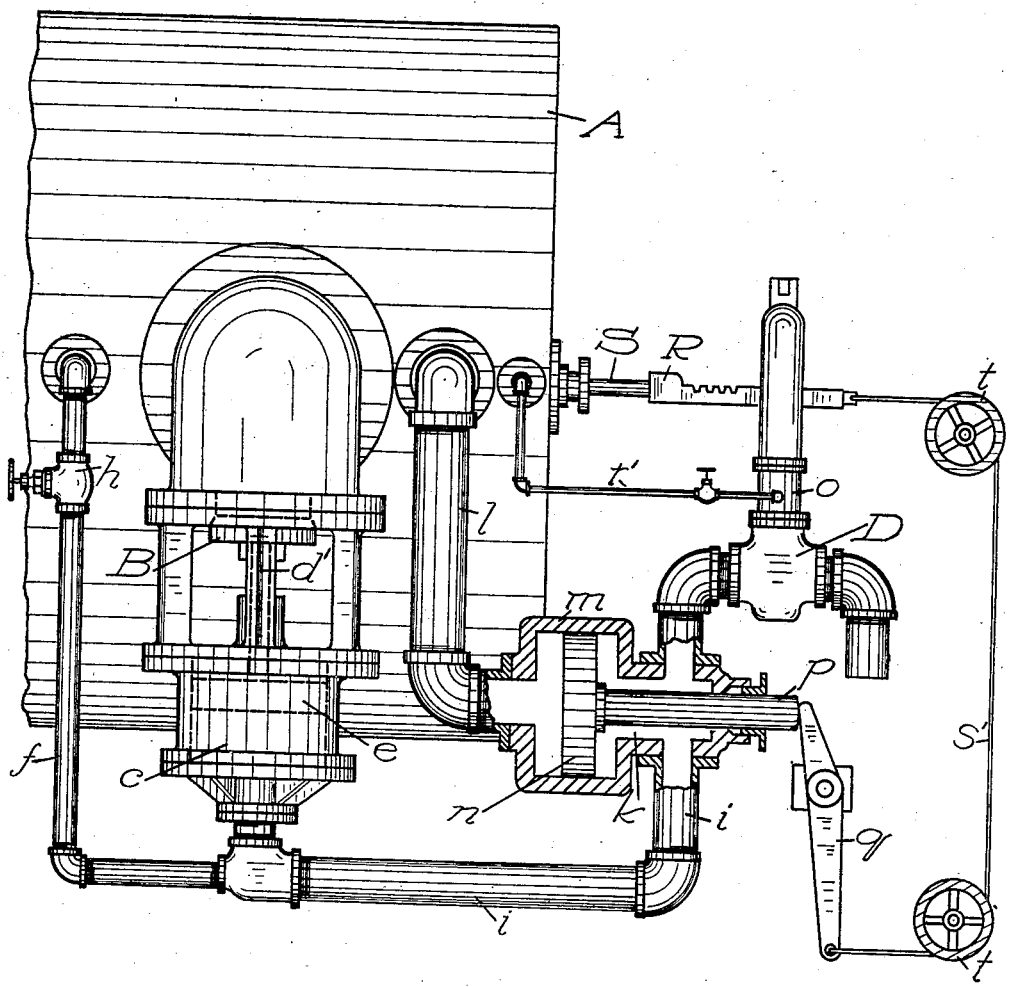
Witness
Charles I. Goodhue
Arthur M. Marston
Inventors
Henry E. Warren
Irving B. Dodge
THE NORRIS PETERS CO., WASHINGTON, D. C.

UNITED STATES PATENT OFFICE.

HENRY E. WARREN, OF NEWTON, AND IRVING B. DODGE, OF ASHLAND, MASSACHUSETTS, ASSIGNORS TO THE LOMBARD GOVERNOR COMPANY, OF ASHLAND, MASSACHUSETTS, A CORPORATION OF NEW JERSEY.

RELIEF-VALVE.

No. 862,859.     Specification of Letters Patent.     Patented Aug. 6, 1907.

Application filed June 29, 1905. Serial No. 267,544.

*To all whom it may concern:*

Be it known that we, HENRY E. WARREN and IRVING B. DODGE, citizens of the United States of America, and respectively residents of Newton and of Ashland, in the county of Middlesex and Commonwealth of Massachusetts, have invented certain new and useful Improvements in Relief-Valves, of which the following is a specification.

The invention relates to hydraulic relief-valves. Heretofore such valves have been operated only by the increase in pressure of the fluid above a fixed standard in the reservoir or system which the valves are intended to safeguard, such for instance, as set forth in Patent No. 703,687, dated July 1, 1902, and these improvements are illustrated as applied to a construction similar to that shown therein. The moving parts of such relief-valves having appreciable inertia, frequently cannot move quickly enough to afford the requisite relief to meet a very sudden rise in pressure in an inelastic fluid like water, due for example, to a sudden checking of the flow of a column under a high head.

The purpose of this invention is to provide means, other than the fluid pressure alone, which act positively to cause the relief-valve to open for a short interval in anticipation of, or simultaneously with, a sudden rise of fluid pressure in the fluid reservoir or conduit; and the invention consists in devices which momentarily withdraw the external pressure that is employed to keep the relief-valve closed while the pressure of fluid in the reservoir remains at, or below, a normal standard, which withdrawing devices are connected with the operating mechanism of the gate or valve which controls the flow of fluid from the reservoir, and are operated simultaneously with such gate mechanism, by which construction and arrangement, the operation of the mechanism that causes the sudden increase of fluid pressure, namely, the closing of the gate, simultaneously operates other means which momentarily relieves such increase of pressure and prevents undue strain upon the reservoir.

In the accompanying drawings, the figure is an elevation of a relief-valve construction substantially the same as that shown in the said Patent No. 703,687, with a convenient form of the improved momentary relief-devices in section.

Referring to the drawings, A is the fluid reservoir or conduit within which it may be assumed is a turbine water-wheel, the flow of water to which is controlled by a gate which is operated by a rack R, through the gate-shaft S. With the reservoir A is connected a relief-valve B, which by means of a rod $d'$ is connected with a piston $e$ within a cylinder $c$. A diaphragm may be employed in place of the piston $e$, but its range of action would be much less. The diameter of the piston $e$ is somewhat larger than that of the valve B, to insure the ready closing of that valve. The cylinder $c$ is connected with the reservoir A by a pipe $f$, provided with a regulating valve $h$. The outlet of the cylinder $c$ is also connected by a pipe $i$, with a waste-valve D, which may be of the balanced valve type, and the stem of this valve may extend into a chamber $o$ where it may be connected with a piston having a spring to press against the outer side thereof and tend normally to keep the valve D closed. The chamber $o$ at a point below the piston therein may be connected by a pipe $t'$ with the reservoir A, so that any increase of pressure in the reservoir will tend to raise the piston and thereby open the valve D, all as set forth in detail in said Patent No. 703,687. A convenient and effective form of the improved momentary relief device as illustrated, consists of a cylindrical chamber $m$, at one side connected by a passage $k$ with the pipe $i$ and at the other with the reservoir A, by a pipe $l$. Within the chamber $m$ is a piston $n$, a rod $p$ from one side of which extends out through a stuffing box. Against the outer end of this piston rod $p$, one end of a lever $q$ bears. The opposite end of the lever $q$ is connected by a cord or chain $s'$ with the rack R. As illustrated the cord $s'$ passes over sheaves $t$. A system of levers or other convenient connection, however, may be employed in place of a cord.

Assuming, for instance, that these pressure relief devices are applied to a water power plant, in order to keep the speed of the water-wheels constant, the gates which supply water thereto will be automatically opened or closed by the governors to correspond with the load changes on the wheels. In the event of a sudden and great falling off in the load, the governors may nearly, or perhaps wholly, close the gates, this through the kinetic energy in the moving water column will produce a great and sudden rise of pressure in the water conduit. Often, this rise will be so sudden that the relief-valve construction ordinarily employed, or such as shown in said Patent No. 703,687, cannot act quickly enough to prevent undue strain or rupture of the conduit. The improved momentary relief devices which are the subject of this invention obviate any such objectionable or disastrous result, for by the interconnection of the piston $n$ with the gate closing rack R, any movement of the rack, tending to close the gate, simultaneously moves the piston inward, which enlarges the fluid space which is in connection with the pipe $i$, thereby withdrawing water therefrom and reducing the pressure which permits the relief-valve B to open momentarily, but for a period sufficiently long to relieve the shock produced by the sudden closing of the gate. Equilibrium in the system $f$, $i$, and $c$ will immediately be established, and unless the pressure in the reservoir A continues above the normal, the relief-valve B will close.

Instead of the fluid pressure through the pipe $l$ upon one side of the piston $n$, a spring may be employed, but the fluid pressure upon each side of the piston is preferable as the one balances the other and the piston consequently, may be moved with small external force.

I claim:—

1. In combination with a reservoir for fluid under pressure, a gate for controlling the flow of fluid therefrom, relief-valve mechanism connected with the reservoir and controlled by fluid pressure therefrom communicated through an independent passage, and means operated by the gate closing mechanism to enlarge the capacity of said passage and momentarily relieve the pressure therein simultaneously with the closing of the gate.

2. In combination with a reservoir for fluid under pressure, provided with a gate to control the flow of fluid therefrom, a relief-valve connected with a piston in a cylinder which has independent fluid connection with the reservoir to counterbalance the relief-valve, a waste-valve with a communicating passage from the outlet of the piston cylinder, means to enlarge the fluid capacity of the passage to the waste-valve and relieve the pressure in the cylinder momentarily, which means are operated by the gate closing mechanism and simultaneously therewith.

3. In combination with a reservoir for fluid under pressure, provided with a gate to control the flow of fluid therefrom, a relief-valve connected with a piston in a cylinder which has independent fluid connection with the reservoir to counterbalance the relief-valve, a waste-valve with a communicating passage from the outlet of the piston cylinder, a chamber connected at one side with the waste-valve passage and at the other with the reservoir, a piston in said chamber, a piston-rod which extends therefrom and mechanism which connects the gate operating devices and this piston-rod, in a manner to cause its piston to enlarge the fluid capacity of the waste-valve passage as the gate is closed, and to diminish its capacity as the gate is opened.

HENRY E. WARREN.
IRVING B. DODGE.

Witnesses:
CHARLES I. GOODHUE,
ARTHUR M. MARSTON.